No. 749,846. PATENTED JAN. 19, 1904.
H. L. CRUTTENDEN.
DENTAL CEMENT INJECTING TUBE.
APPLICATION FILED MAR. 28, 1903.
NO MODEL.

Witnesses.
N. D. Kilgore
A. H. Opsahl

Inventor.
Henry L. Cruttenden.
By his Attorneys.
Williamson & Merchant

No. 749,846. Patented January 19, 1904.

UNITED STATES PATENT OFFICE.

HENRY L. CRUTTENDEN, OF NORTHFIELD, MINNESOTA.

DENTAL-CEMENT-INJECTING TUBE.

SPECIFICATION forming part of Letters Patent No. 749,846, dated January 19, 1904.

Application filed March 28, 1903. Serial No. 149,936. (No model.)

*To all whom it may concern:*

Be it known that I, HENRY L. CRUTTENDEN, a citizen of the United States, residing at Northfield, in the county of Rice and State of Minnesota, have invented certain new and useful Improvements in Dental - Cement - Injecting Tubes; and I do hereby declare the following to be a full, clear, and exact description of the invention, such as will enable others skilled in the art to which it appertains to make and use the same.

My present invention relates to dental-cement-injecting tubes, and is in the nature of an improvement on the device disclosed and claimed in my prior patent, No. 716,677, of date December 23, 1902, entitled "Collapsible dental-cement-injecting tube."

The primary object of my present invention is to provide a collapsible tube of the above character which is not only of very small cost, but which is transparent, at least to such an extent that the condition of the cement within the tube may be observed through the walls of the tube.

To the above ends the invention consists of the novel construction hereinafter described, and defined in the claim.

The improved tube is illustrated in the accompanying drawings, wherein like characters indicate like parts throughout the several views.

Figure 1:
Figure 2:
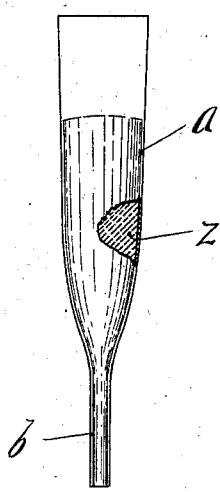
Figure 3:
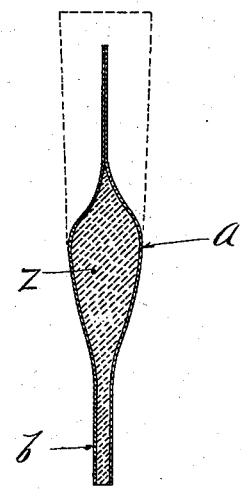

Figure 1 is a plan view of the tube. Fig. 2 is an enlarged view of the tube in plan with some parts broken away and showing the tube partly filled with cement; and Fig. 3 shows the tube partly collapsed, its normal form being indicated by dotted lines.

The character $a$ indicates the body of the collapsible tube, which tube is open at one end and is formed at its other end with an attenuated or capillary discharge-nipple $b$, through which the cement is injected. In the present instance, as in my prior patent, the discharge-nipple $b$ is small enough and long enough to reach the bottom of the cavity or canal of the root into which the cement is to be injected.

As before indicated, the principal feature of my present invention consists in making the collapsible tube of transparent and collapsible material. I have found that gelatin will best answer this purpose, both on account of its cheapness and its transparency.

In Fig. 2 the cement $z$ is indicated as being visible through the transparent walls of the tube. Gelatin is of course very pliable and makes a tube which may be easily collapsed.

It is important that the tube be transparent to such an extent that the condition of the cement within the tube may be observed from the exterior of the tube. This enables the dentist to note whether or not the cement within the tube is in proper working condition and whether or not air-bubbles have formed in the cement.

It is desirable, and in fact almost necessary, that the collapsible tube be used but once and then thrown away. Such tubes formed of gelatin are of such small cost that this treatment is rendered practicable and economical.

What I claim, and desire to secure by Letters Patent of the United States, is as follows:

A collapsible dental-cement-injecting tube having a large opening at one end and an attenuated discharge-nipple at its other end, said tube being formed of collapsible, transparent material, substantially as described.

In testimony whereof I affix my signature in presence of two witnesses.

HENRY L. CRUTTENDEN.

Witnesses:
N. W. NORTON,
L. LOUISE ORR.